United States Patent
Guler et al.

(10) Patent No.: US 7,249,088 B2
(45) Date of Patent: Jul. 24, 2007

(54) JOINT ESTIMATION OF BIDDERS' RISK ATTITUDES AND PRIVATE INFORMATION

(75) Inventors: Kemal Guler, Cupertino, CA (US); Tongwei Liu, Redwood City, CA (US); Hsiu-Khuern Tang, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 811 days.

(21) Appl. No.: 09/904,311

(22) Filed: Jul. 11, 2001

(65) Prior Publication Data

US 2003/0014349 A1 Jan. 16, 2003

(51) Int. Cl.
*G06Q 40/00* (2006.01)

(52) U.S. Cl. .......................... 705/37; 705/35
(58) Field of Classification Search .................. 705/1, 705/35, 37; 463/9
See application file for complete search history.

(56) References Cited

U.S. PATENT DOCUMENTS

| | | | | |
|---|---|---|---|---|
| 5,905,975 | A * | 5/1999 | Ausubel ...................... | 705/37 |
| 5,974,403 | A * | 10/1999 | Takriti et al. ................ | 705/412 |
| 6,564,192 | B1 * | 5/2003 | Kinney et al. ................ | 705/37 |
| 6,647,373 | B1 * | 11/2003 | Carlton-Foss ................ | 705/37 |
| 2002/0046148 | A1 * | 4/2002 | Alaia et al. .................... | 705/37 |
| 2002/0073009 | A1 * | 6/2002 | Hogg et al. .................... | 705/37 |
| 2002/0111889 | A1 * | 8/2002 | Buxton et al. ................. | 705/35 |
| 2002/0116315 | A1 * | 8/2002 | Grey et al. .................... | 705/37 |
| 2002/0120552 | A1 * | 8/2002 | Grey et al. .................... | 705/37 |
| 2002/0174050 | A1 * | 11/2002 | Eynard et al. ................. | 705/37 |
| 2002/0174052 | A1 | 11/2002 | Guler et al. | |
| 2002/0188545 | A1 * | 12/2002 | Wiesehuegel et al. ........ | 705/37 |
| 2003/0004850 | A1 * | 1/2003 | Li et al. ....................... | 705/37 |
| 2003/0009421 | A1 * | 1/2003 | Bansal et al. ................. | 705/39 |
| 2003/0018560 | A1 * | 1/2003 | Dietrich ....................... | 705/37 |

OTHER PUBLICATIONS

Sandra Campo et al., "Semiparametric Estimation of First-Price Auctions with Risk Averse Bidders," Oct. 2000, 35 pp.
E. Maskin et al., "Optimal Auctions With Risk Averse Buyers," Econometrica, vol. 52, No. 6, Nov. 1984, pp. 1473-1518.
E. Silberberg, "The Structure of Economics, A Mathematical Analysis," Second Edition, Chapters 13 & 13.3, Copyright 1990 McGraw Hill, Inc., pp. 440-461.
J. W. Pratt, "Risk Aversion in the Small and in the Large," Econometrica, vol. 32, No. 1-2, Jan.-Apr. 1964), pp. 122-136.
W. Nicholson, "Microeconomic Theory, Basic Principles and Extensions," Seventh Edition, Chapter 8, Copyright 1978 The Dryden Press, pp. 211-241.
P. R. Milgrom et al., "A Theory of Auctions and Competitive Bidding," Econometrica, vol. 50, No. 5, Sep. 1982, pp. 1089-1122.
R. P. McAfee et al., "Auctions and Bidding," Journal of Economic Literature, vol. XXV, Jun. 1987, pp. 699-733.

* cited by examiner

*Primary Examiner*—Alain L. Bashore (57) ABSTRACT

A method and apparatus for determining private information and risk attitudes of bidders at auctions. By varying auction formats, the underlying risk attitudes and joint distribution of bidders' private information is extracted. Bids submitted in utility-independent auctions are used to determine the bidders private information. Risk attitudes for bidders are determined using utility-dependent auctions and using the determined bidders' private information. When there is insufficient auction data for determining private information and risk attitudes, additional auctions are conducted to obtain the needed auction data. The results can then be used for designing auctions and for determining bids to be made by buyers.

26 Claims, 5 Drawing Sheets

JOINT ESTIMATION OF BIDDERS' RISK ATTITUDES AND PRIVATE INFORMATION

FIELD OF THE INVENTION

The present invention pertains to the field of auction designs and auction analysis. Specifically, this invention relates to a method for determining both the risk attitudes and the joint distribution of private information of bidders.

BACKGROUND ART

In an auction, a variety of decisions must typically be made by each of the participants. When the auction is run by the seller, the bidders must decide whether or not to bid. Upon deciding to bid, they must decide how much to bid. This decision process is conditional on information that the bidder has available regarding the objects being auctioned, rivals, etc.

The seller and/or the person who runs the auction must make decisions regarding what auction format to use and the reserve prices for items to be auctioned. Additionally, the seller must consider entry fees, quantity of items to be auctioned, timing and duration of the auction, lot sizes, bundling of items, sequence of lots, bid increments, information disclosure policy, etc. Standard auction formats include sealed bid first price, Dutch, sealed bid second price(or Vickrey), English, etc.

Recently, methods have been determined for assisting the buyer and the seller in making these decisions. These methods typically involve analysis of prior auctions for determining the joint distribution of private information and for determining risk attitudes.

One prior art method for analyzing auction data assumes that bidders are risk neutral and uses observed bids from available types of auctions to estimate the joint distribution of private information. However, if the assumption of risk-neutrality is incorrect, estimated joint distribution of private information will have no systematic relation to the true distribution and hence cannot be reliably used as input in formulations of decision problems.

Another prior art method for analyzing auction data uses estimation models that are restricted to parametric families of functions for determining the joint distribution of private signals and for determining risk attitudes. However, there is no theoretical or empirical basis to justify the a priori restrictions imposed on the forms of the latent functions that are to be estimated. Therefore, this method also gives unreliable results.

Thus, conventional methods for analyzing auction data do not provide sufficiently accurate results to be of use to either the buyer or the seller in making the necessary decisions. Therefore, buyers and sellers must use personal knowledge and experience to make decisions on a personal, best-guess basis.

Accordingly, there is a need for a method and apparatus that will assist the buyer in making decisions relating to a particular auction. In addition, there is a need for a method and apparatus that meets the above need and that will assist the seller in making decisions relating to a particular auction. Moreover, there is a need for a method and apparatus that meets the above needs and that allows for accurately determining bidder's private information. In addition, there is a need for a method and apparatus that meets the above needs and that allows for accurately determining risk attitudes.

SUMMARY OF THE INVENTION

The present invention enables a seller/buyer conducting an auction for selling/procuring an item(s) to factor bidders' attitudes toward risk and the bidders' private information into their decisions regarding the appropriate auction procedure to conduct. As neither the bidders' attitudes toward risk nor the structure of private information held by bidders is directly observable, the present invention provides a method for extracting both the risk attitudes and the private information of the bidders. This is accomplished by exploiting systematic variations in bidders' behavior under different auction rules.

A method and apparatus for determining private information and risk attitudes for bidders are disclosed. First, auction data from previously conducted utility-dependent auctions and previously conducted utility-independent auctions is analyzed. In this application an auction belongs to the "utility-dependent" classification if the bidding behavior it induces depends on the utility function of the bidders; otherwise it belongs to the "utility-independent" classification. Examples of utility-dependent auction formats are sealed bid first price and Dutch auctions; examples of utility-independent auction formats are sealed bid second price and English auctions. Private information for the bidders is determined using bids submitted in utility-independent auctions for identical or similar items. Risk attitudes are determined for the bidders using bids from utility-dependent auctions for identical and similar items and using the previously determined private information.

When the auction data from previously conducted utility-independent auctions is not sufficient for determining private information for the bidders, additional utility-independent auctions are conducted. Auction data from these additional utility-independent auctions are used along with data from previously conducted utility-independent auctions to determine private information for bidders.

Similarly, when the auction data from previously conducted utility-dependent auctions is not sufficient for determining risk attitudes for the bidders, additional utility-dependent auctions are conducted. Auction data from these additional utility-dependent auctions are used along with data from previously conducted utility-dependent auctions to determine risk attitudes for bidders.

In one embodiment, statistical density estimation techniques are used to nonparametrically estimate the joint distribution of bidders' private information and "quantile matching" methods are used to nonparametrically estimate risk attitudes for bidders.

Output is generated either in tabular form or in graphical form for indicating private information and for indicating risk attitudes. In the present embodiment, output is generated in the form of a table that indicates the joint distribution of private information for the bidders and a table that indicates the risk attitudes for the bidders. Also, output can be generated in the form of a graph that indicates the joint distribution of private information for the bidders and a graph that indicates the risk attitudes for the bidders.

Accordingly, the method and apparatus of the present invention exploits systematic variations in bidders' behavior under different auction formats. Because only bid data from utility-independent (or English) auctions is used to identify and estimate the joint distribution of bidder information (private information), an accurate determination of private information results. Similarly, by using the private information along with only bids from sealed-bid first-price auctions, an accurate determination of the latent utility-of-wealth (risk attitude) function of the bidders results.

Other features and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic information capable of being stored, transferred, combined, compared, and otherwise manipulated in a computer system. It has proven convenient at times, principally for reasons of common usage, to refer to these information as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "analyzing," "determining," "using," "extracting," "accumulating" or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Exemplary Computer System

Figure 1:
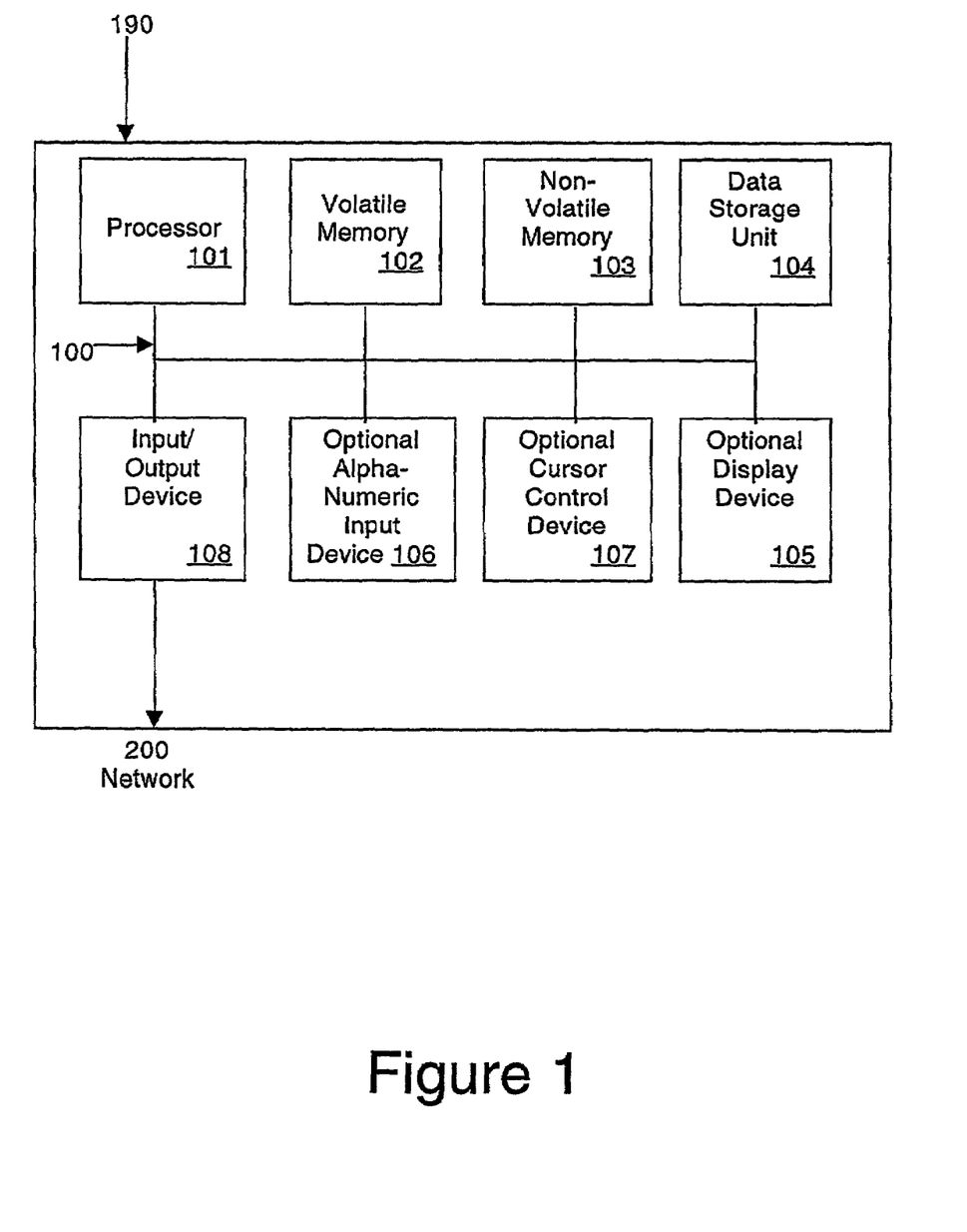
FIG. 1 is a block diagram of an exemplary computer system upon which embodiments of the present invention may be practiced.

In general, computer system 190 of FIG. 1, used by an embodiment of the present invention, comprises an address/data bus 100 for communicating information, one or more central processors 101 coupled with bus 100 for processing information and instructions. Central processor unit 101 may be a microprocessor or any other type of processor. The computer system 190 also includes data storage features such as a computer usable volatile memory unit 102 (e.g., random access memory, static RAM, dynamic RAM, etc.) coupled with bus 100 for storing information and instructions for processor(s) 101. System 190 also includes an optional signal input and output device 108 coupled with bus 100 for enabling system 190 to interface with other electronic devices. In one embodiment of the present invention, the input and output device 108 is a serial communication port, but could also be any number of well known communication standards and protocols, e.g., Universal Serial Bus (USB), Ethernet, FireWire (IEEE 1394), parallel, small computer system interface (SCSI), infrared (IR) communication, Bluetooth wireless communication, etc.

Optionally, computer system 190 can include a display device 105 that is coupled to bus 100 for displaying graphics and/or video. It should be appreciated that optional display device 105 may be a cathode ray tube (CRT), flat panel liquid crystal display (LCD), field emission display (FED), or any other display device suitable for displaying video and/or graphic images and alphanumeric characters recognizable to a user. Furthermore, system 190 can include an optional alphanumeric input device 106 including alphanumeric and function keys coupled to the bus 100 for communicating information and command selections to the central processor(s) 101.

Additionally, the computing device 190 of FIG. 1 can include an optional cursor control device 107 coupled to the bus 100 for communicating user information and command selections to the central processor(s) 101. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 2:
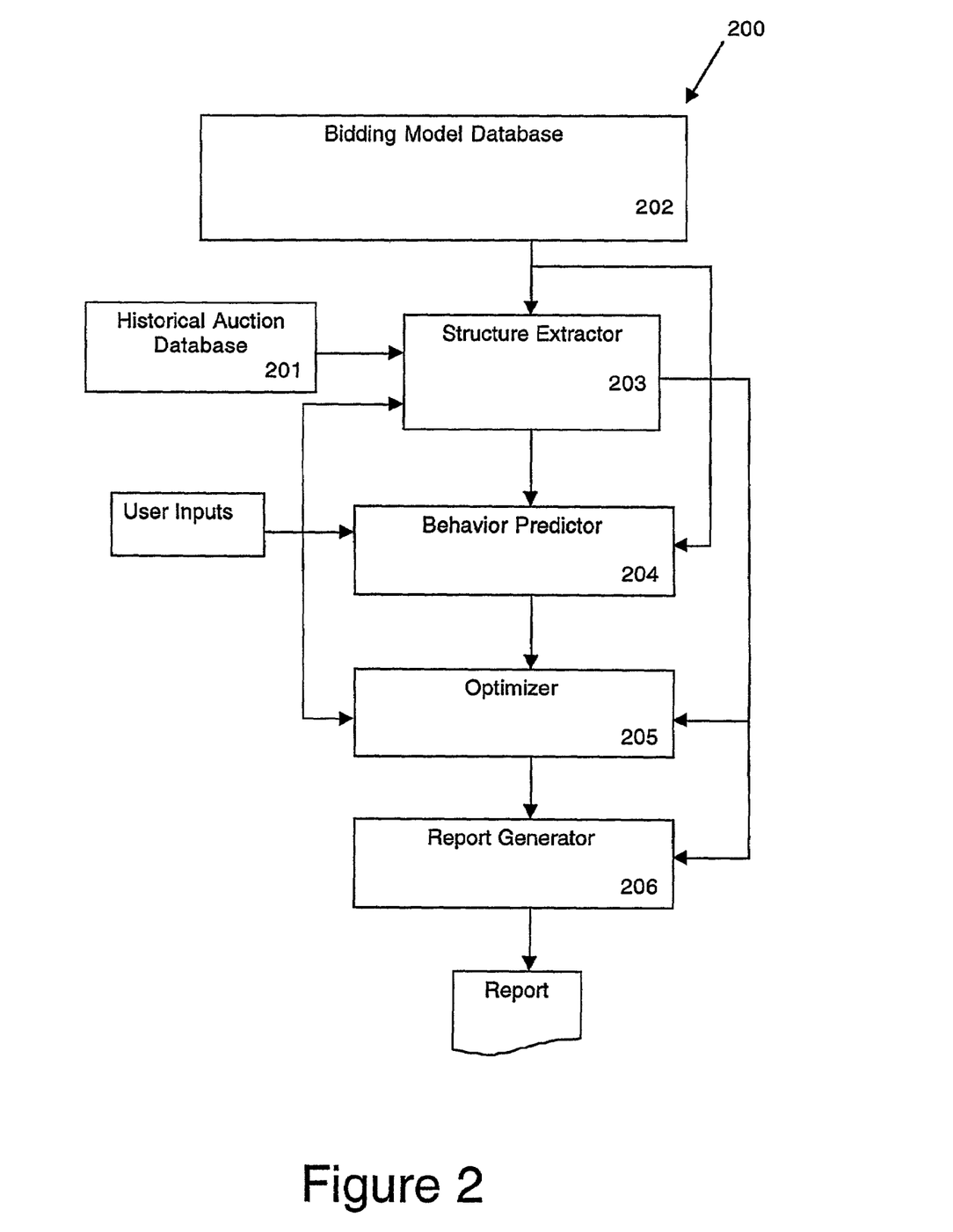
FIG. 2 schematically shows an automated decision support system for designing auctions in accordance with one embodiment of the present invention.

FIG. 2 shows an automated decision support system 200 for designing auctions in accordance with one embodiment of the present invention. In one embodiment, the automated decision support system 200 is a software-system implemented in a computer system such as that illustrated in FIG. 1. Alternatively, hardware or firmware can implement the automated decision support system 200.

The automatic decision support system 200 is used to provide decision support for auction design. This means that the automatic decision support system 200 aids auction sellers, buyers, bidders, or auction houses in making auction-related decisions. There are typically a number decisions to be made regarding an auction. For example, in an auction run by a seller, a bidder has to decide on how to bid and whether or not to bid in a specific auction conditional on information the bidder has. In addition, the bidder needs to decide whether or not to gather information on auctions, objects, and/or rivals. If he decides that gathering such information is worthwhile, he must then determine how to gather the information. The auction house for the auction needs to decide fees for buyers and/or sellers. In addition, the auction house needs to decide the options of auction formats to offer.

Similarly, in an auction run by a seller, the seller also has to decide what the reserve price of the auctioned item should be, what is the best auction format, what entry fees should be charged for participating in the auction, what timing and duration of the auction should be, the quantity of the item to be auctioned, what participation rules should govern the auction, and what information rules should be imposed on the auction, etc. As is known, these decisions affect the revenue or profit generated from the auction.

In order to achieve the maximum revenue or profit, the auction designer must optimize these decisions. In accordance with one embodiment of the present invention, this optimization is done by the automatic decision support system 200. The automatic decision support system 200 provides optimal configuration of auction design parameters and comparative evaluation of any pair of design choices. In other words, the automatic decision support system 200 provides automated auction analysis optimization.

In accordance with one embodiment of the present invention, the automatic decision support system 200 processes available data using structural econometric techniques to identify the latent distribution of random or unknown elements of the market structure or market environment of a particular auction. In addition, the automatic decision support system 200 provides the optimal values of any subset of the decision variables or candidates based on an evaluation criterion specified by the user of the system 200, conditional on the levels of the remaining decisions.

The data available to the automatic decision support system 200 include data supplied by the user of the system 200. The data include a description of the item to be auctioned, auction decision candidates, constraints, and auction evaluation criterion. These are user inputs to the automatic decision support system 200. The available data also include historical auction data and bidding model data. The historical auction data and the bidding model data are stored in the automatic decision support system 200.

The automatic decision support system 200 receives the user inputs of the description of the item to be auctioned, the auction decision candidates, the constraints, and the auction evaluation criterion. The automatic decision support system 200 then selects the best auction decision candidates (e.g., the best auction format is English, the reserve price is $100, the entry fee is $5, and the duration is five days) among the inputted auction decision candidates based on the auction evaluation criterion and the estimated market structure of the auction.

The term "market structure" is a well-known term in the field of econometrics. It means substantially the same as the term "auction environment" (or market environment). Thus, these terms are interchangeable. The term "market structure" indicates, in the auction context, environmental factors or conditions that may affect potential bidders in the actual bidding during the auction (or in the auction-related decision making process). In other words, the market structure indicates the factors that may affect a bidder in decisions related to the auction. This term also covers the structure of private information held by bidders of the auction. The private information specifies any information held privately by a bidder or potential bidder (i.e., information not possessed by other bidders or seller). Typically, a bidder's willingness to pay for the auctioned item is known only by the bidder himself/herself. Another example of the market structure may be the results of privately conducted tests obtained by individual bidders before the auctioning of an item, like an oil and gas contract. In this case, the value of the auctioned item may be the same for every bidder, but each bidder has a private estimate of what that value may be. Another example of the market structure is that the current capacity utilization of company bidding for a contract is typically known by the company itself and not by rival bidders. The market structure affects bidding behavior of bidders during the auction.

Bidding behavior determines the outcome of an auction. The outcome of an auction means who gets what and who pays how much, etc. Different auction rules induce different bidding behavior on the part of bidders. A bidder's behavior under a given set of auction rules in turn is determined by his private information. The structure of private information held by bidders is thus a key factor in evaluating alternative auction procedures (e.g., auction format, reserve prices, entry fees, timing and duration of the auction, quantity, participation rules, and information rules, etc.) from the point of view of a seller (or buyer) trying to sell (or procure) an item by auctioning. This fundamental element of an auction environment is not directly observable and has to be estimated from observable and available data. The auction procedures can also be referred to as auction mechanisms. They include the characteristics of the auction.

In accordance with one embodiment of the present invention, the automatic decision support system 200 estimates the unknown or unobservable elements of the market structure of the auction by determining bidders' risk attitudes and private information. In the present embodiment, bidders' private information can be represented by a chart, or a graph. The private information can also be represented by a mathematical equation that indicates the joint distribution of private information of the bidders (e.g., the probability distribution of bidders' willingness to pay, the probability distribution of the number of potential bidders, etc.). In particular, the automatic decision support system 200 estimates the unknown elements of the market structure by (1) expressing unobservable variables in the bidding model in terms of the observable bid data, and (2) applying known statistical density estimation techniques to the expression so as to obtain an estimation of the unknown elements. In the embodiment shown in FIG. 4, method 400 is used to determine bidders' risk attitude and private information. The determined bidders' risk attitude and private information are used by the automatic decision support system 200 to enable the user (either a seller or a buyer) of the system 200 to factor the distribution of bidders' private information into his/her decisions regarding the appropriate auction procedure to conduct the auction.

With the estimated unknown elements of the market structure and other user inputs (e.g., the auction design candidates, evaluation criterion), the automatic decision support system 200 provides optimized auction design candidates based on the evaluation criterion provided such that maximized expected revenue or profit from the auction can be achieved. This means that the automatic decision support system 200 can be used to configure optimized auction parameters for a multiplicity of performance criteria. This also means that the automatic decision support system 200 can be used to configure auction parameters for the purpose of demand estimation. Thus, even if seller/buyer chooses not to use auctions for selling or buying, properly configured auctions can provide both rich sources of data and novel estimation methodologies for demand estimation for the item.

Continuing with FIG. 2, automatic decision support system 200 includes a historical auction database 201, a bidding model database 202, a structure extractor 203, a behavior predictor 204, and an optimizer 205. The historical auction database 201 stores the historical auction data for previously conducted auctions. The historical auction data includes auction characteristics and/or mechanisms of previous auctions. This means that the historical auction data include the bid data and the auction characteristics data of each of the stored previous auctions. The auction characteristics data specify the auction procedure of the auction. In the present embodiment, the auction characteristics data of an auction describe the reserve price of the auctioned item, the auction format, the number of bidders, etc. of the particular auction. The bid data of an auction describe the bidding behaviors of bidders in the auction. The bid data is a record that typically contains the auction identifier, number of bidders N, number of bids, transaction price, winner, reserve price, auction format, item characteristics, bidder characteristics. Both the bid data and the auction characteristics data are extracted from the auction data of the previous or historical auctions for various items. The historical auction database 201 can be implemented using any known database technology.

The bidding mode database 202 stores various bidding models. A bidding model specifies a bidding behavior pattern. It is a function of auction characteristics or procedure of the corresponding auction. It is also a function of the market structure of the auction. For example, a Dutch auction bidding model specifies bidding behavior in a Dutch format auction. An English auction-bidding model specifies bidding behavior in an English format auction. A utility-dependent auction-bidding model specifies bidding behavior in a utility-dependent auction. The bidding model database 202 can be implemented using any known database technology.

The structure extractor 203 estimates the unknown elements of the market structure of the auction. The structure extractor 203 first receives the user input of the item (and its characteristics) to be auctioned. The structure extractor 203 then accesses the database 201 for the bid data and auction characteristics data observed in previous or historical auctions of similar items of the item. The structure extractor 203 is connected to the historical auction database 201 and the bidding model database 202. The structure extractor 203 then produces a non-parametric structural estimate of the unobservable latent structure of the environment of the auction. The structure extractor 203 uses auction theory and non-parametric statistical methods to extract an estimate of the latent structure from the previously observed bids.

The bidding behavior predictor 204 predicts bidding behaviors of bidders in the auction based on the user inputs of a set of auction decision candidates and constraints. The bidding behavior predictor 204 receives the estimated unknown elements of the market structure from the structure extractor 203. In addition, the behavior predictor 204 receives the user inputs of auction decision candidates and constraints.

The auction decision candidates are candidates for evaluation by the system 200. For example, one auction decision candidate may be a Dutch auction with a reserve price $R_p$ between $100 and $300 for printer (i.e., the item to be auctioned). Another auction decision candidate may be an English auction with a reserve price $R_p$ between $75 and $200 for printer.

The constraints specify limitations on the non-auction-format auction parameters. For example, one of the constraints supplied to the behavior predictor 204 can be that bidders must be invited for the Dutch auction of the printer. Another constraint may be that bidders for the English auction need not be invited to participate in the auction.

The behavior predictor 204 uses the received auction decision candidates and the constraints to access the repository 202 in order to receive the bidding model or models that match the auction decision candidates. Then the behavior predictor 204 applies the estimated structure elements to the bidding model or models to obtain the bidding behavior prediction for each of the auction decision candidates.

The optimizer 205 is used to evaluate each auction decision candidate provided by the user in accordance with evaluation criterion also provided by the user of the system 200. The optimizer 205 employs the evaluation criterion provided by the user to generate an evaluation of each of the auction design candidates based on the estimated unknown elements of the market structure and the predicted bidding behavior of bidders. Examples of the evaluation criteria include expected profit, probability of sale, expected efficiency, etc.

Figure 3:
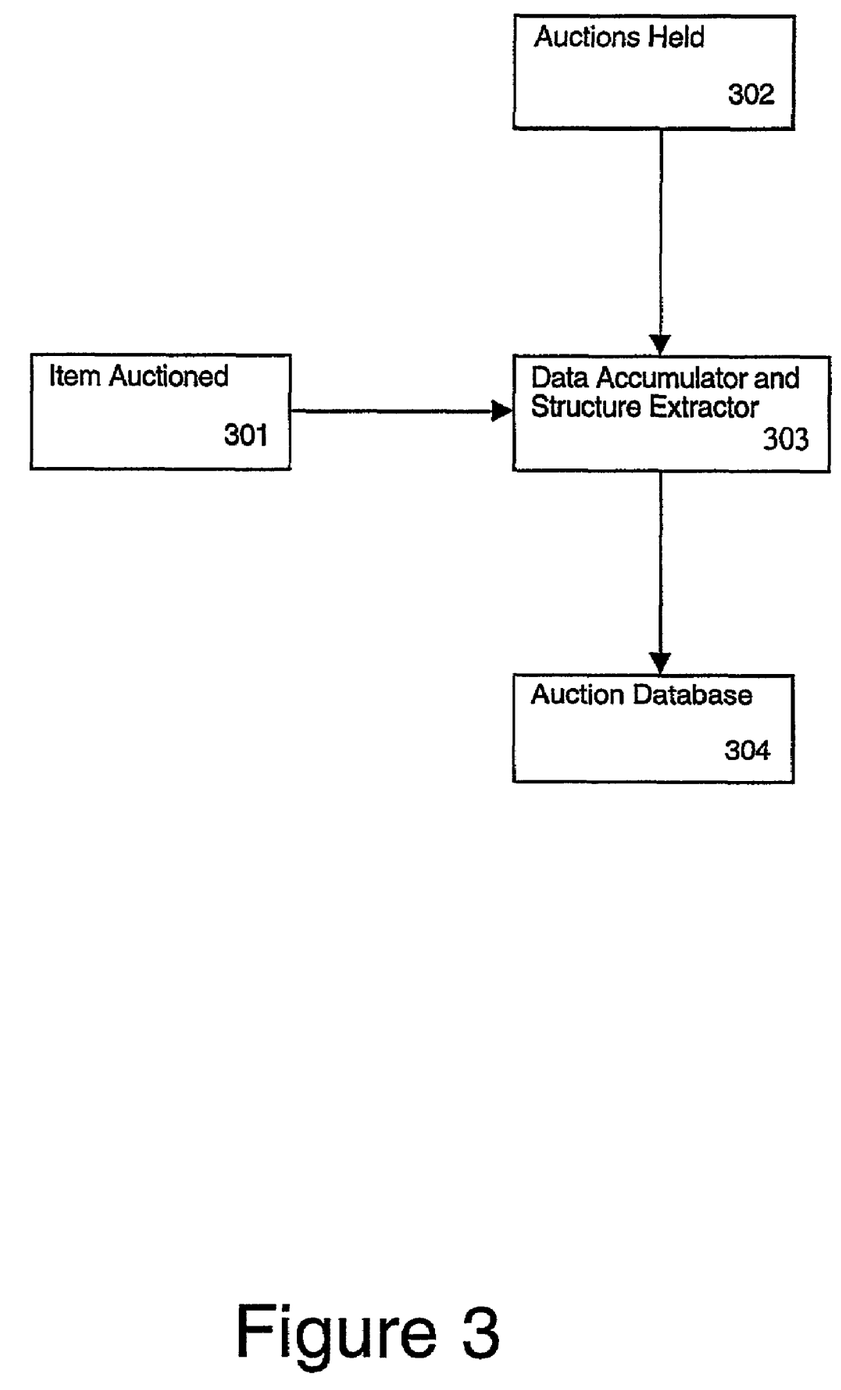
FIG. 3 is a block diagram illustrating a process for obtaining auction data in accordance with one embodiment of the present invention.

FIG. 3 is a block diagram illustrating the process of obtaining the relevant data in accordance with one embodiment of the present invention. For a given auction item as shown in block 301 of FIG. 3, multiple auctions are run, illustrated in block 302 of FIG. 3, and certain data is accumulated or extracted as illustrated in block 303. The accumulated data 303 contains, but may not be limited to, such information as the type of auction, auction characteristics or rules, the item being auctioned and its characteristics, the number of submitted bids, the number of bidders, and the characteristics of each bidder including the bid price. For a given item, multiple auctions are held and multiple sets of data are accumulated. These data sets are all stored in the auction database or historical auction data database, illustrated in block 304 of FIG. 3 and block 201 of FIG. 2, for future use in jointly estimating bidders' private information and risk attitudes.

Figure 4:
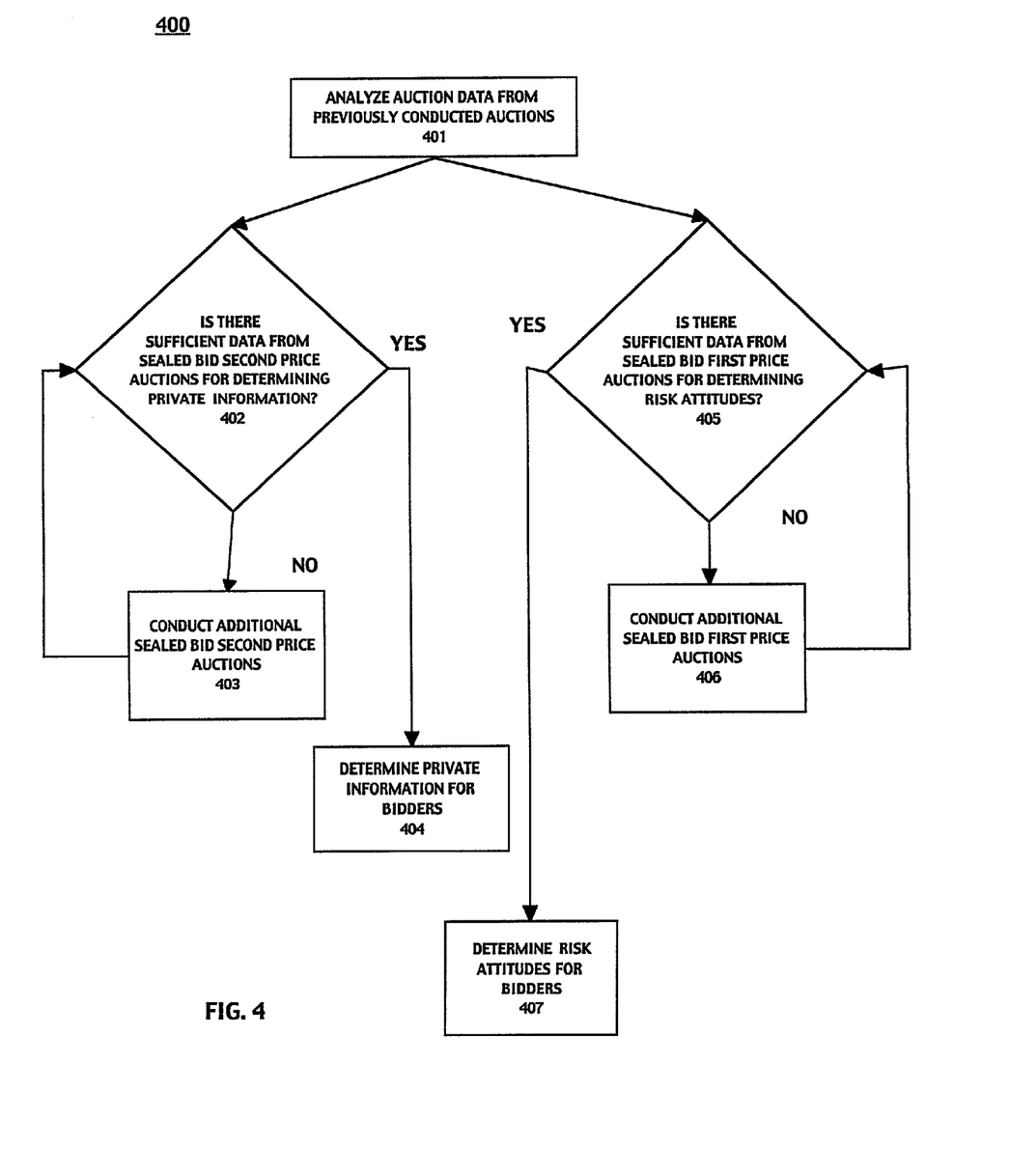
FIG. 4 is a block diagram that illustrates a method for obtaining estimates of bidders' risk attitudes and private information in accordance with one embodiment of the present invention.

FIG. 4 is a process block diagram of the steps in a process 400 for obtaining the estimates of bidders' risk attitudes and private information in accordance with one embodiment of the present invention. In the present embodiment, aspects of process 400 are implemented using a computer system 190 as illustrated in FIG. 1. However it is appreciated that process 400 can be implemented on a different computer system. Although specific steps are disclosed in process 400, such steps are exemplary. That is, the present invention is well suited to performing various other steps or variations of the steps recited in FIG. 4. Within the present embodiment, it should be appreciated that the steps of process 400 may be performed by software or hardware or by any combination of software and hardware.

As shown by step 401, auction data from previously conducted auctions is analyzed. In the present embodiment, the characteristics of the item of interest are input. Auction data from previously conducted auctions for the same or similar items is analyzed. Auction data can include auction format, auction item, time of auction, number of bidders, number of submitted bids, characteristics of each bidder and price bid. If the item in step 401 has previously been auctioned, the relevant information from the auction is factored into the database for estimating the bidders' private information.

In one embodiment of step 401, the analyzed data from previously conducted auctions is accumulated into each of two sets as a function of the auction format. Data in the first set includes utility-independent (or Vickrey) auction data. In these auctions the highest bidder wins but pays the second highest price. Therefore the utility-independent auction format factors out the bidders' risk attitude, known as the utility function, U( ). This is an optimal bidding strategy as it is only dependent upon what the bidder is willing to pay, or the demand function, 1−F( ). where F( ) is the joint distribution of bidders' private information.

Referring to steps 402 and 403, if there is insufficient auction data from the previously conducted utility-independent auctions for determining bidders' private information, additional utility-independent auctions are conducted, as shown in step 403, until sufficient information is obtained.

In step 404 bidders' private information is determined. In the present embodiment, private information is represented by a demand function, 1−F($v_i$), where $v_i$ (i=1 . . . n) denotes the bidder i's private information. This demand function is typically interpreted as bidder i's willingness to pay for the item. In one embodiment, determination of private information is obtained using a non-parametric estimation of the joint distribution of private information, F($v_i$, . . . $v_n$) of the bidders.

Figure 5:
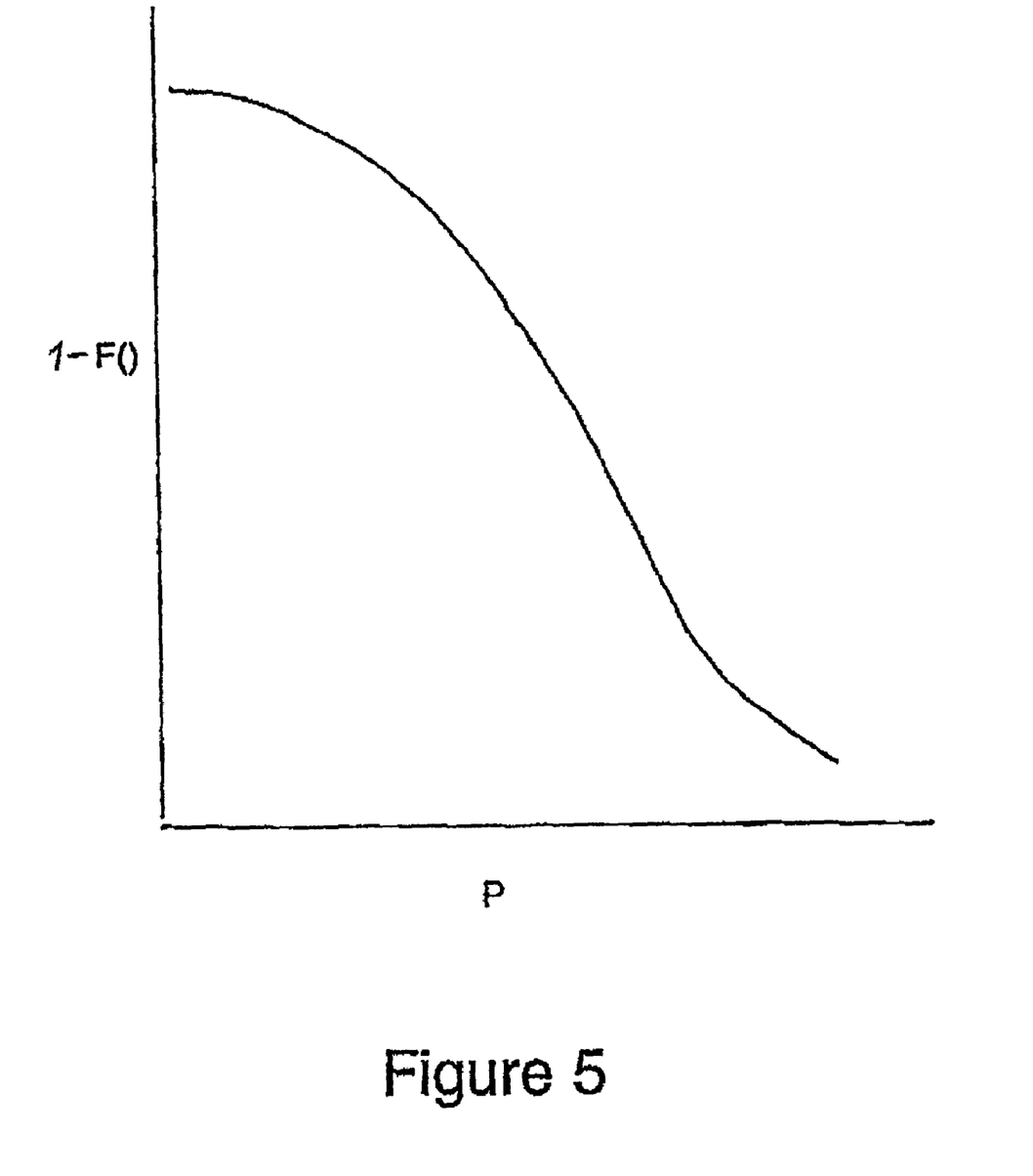
FIG. 5 illustrates an exemplary relationship between bidders' private information or willingness to pay and the price of the item.

FIG. 5 illustrates an exemplary graph of a demand function, 1−F( ) as a function of Price, P. This data set is used to non-parametrically estimate the joint distribution of private information, F($v_i$, . . . $v_n$), of the bidders.

Referring to steps 405 and 406, if there is insufficient data from previously conducted utility-independent auctions for determining risk attitudes, additionally utility-dependent auctions are conducted. These additional auctions are conducted, as shown in step 406, until sufficient information is obtained. In the present embodiment first sealed bid auctions are representative of the utility function U( ), or the bidders' attitude toward risk.

As shown by step 407, risk attitude is determined. In the present embodiment risk attitude is represented by a utility of wealth function, U(w) that is representative of the bidders' attitudes toward risk. If a bidder with private valuation, $v_i$, and current wealth, w, wins the item at a price, b, his utility of winning the auction is U(w+$v_i$−b), and his utility of not winning is U(w). A concave function U( ) indicates risk aversion, whereas a linear utility of wealth function characterizes risk neutrality.

Continuing with step 407 of FIG. 4, in the present embodiment, the joint distribution function, F( ), that represents private information, is used in the structural analysis of both auction data from previously conducted auctions and auction data from step 406 to non-parametrically estimate the unknown utility of wealth function, U( ).

A report is then generated that indicates F( ) and U( ) from steps 404 and 407. In the present embodiment, the report is in tabular form. Alternatively, the report is in graphical form or in the form of a mathematical function.

In one embodiment of the present invention step 407 of FIG. 4 is performed according to the following example. In the present example, several copies of the same item are to be sold (e.g., several identical printers). Several auctions are analyzed using the second-price sealed bid format. Under this format, each bidder is expected to bid his value, i.e., he does not "shade" his bid. Thus, the joint distribution of the bidders' values can be estimated by using standard statistical density estimation techniques applied to the bid data directly. Several auctions are then analyzed (and/or new auctions are conducted) using the sealed-bid first-price format. Under such a format, the bid submitted by a bidder depends on both his value and his risk attitude. Assume that there are k symmetric bidders in each auction. Let their common utility function be U( ). Then the value v and bid b of a bidder is related by the following equation:

$$v = b + \lambda^{-1}\left(\frac{G(b)}{(k-1)g(b)}\right), \quad (1)$$

where G( ) and g( ) are the distribution function and density function, respectively, of b, and $\lambda^{-1}$ is the inverse of the function $\lambda$=U/U'. The problem we face is estimating U( ), or equivalently, $\lambda$( ). The following "quantile-matching" method can then be used for estimating U( ), or equivalently, $\lambda$( ), wherein $v_0$, $v_{1/100}$, $v_{2/100}$, . . . , $v_{99/100}$, $v_1$ are quantities of v satisfying the relationship F($v_{j/100}$)=j/100, j=0, 1, . . . , 100, where F is the (marginal) distribution of v estimated from the first stage of the experiment.

In the present embodiment $b_0$, $b_{1/100}$, $b_{2/100}$, . . . , $b_{99/100}$, $b_1$ are similarly defined quantiles of b. Next, we use the fact that the corresponding quantiles of b and v must satisfy equation (1), giving the equation:

$$v_{j/100} + b_{j/100} + \lambda^{-1}\left(\frac{G(b_{j/100})}{(k-1)g(b_{j/100})}\right). \quad (2)$$

In equation (2), G($b_{j/100}$)=j/100 by definition of $b_{j/100}$, and g($b_{j/100}$,) can be estimated using standard density estimation techniques applied to the bid data. Hence, equation (2) provides us with an estimate of $\lambda^{-1}$( ) and hence of $\lambda$( ), on a discrete set of points. From this, we derive an estimate of U( ) by solving the differential equation $\lambda$=U/U', which leads to the equation:

$$U(w) = \exp\left(\int_0^w (1/\lambda(u))du\right). \quad (3)$$

Thus, the present invention allows a decision-maker to estimate the unobservable risk attitudes and private information of bidders without resorting necessarily to ad hoc a priori assumptions on the functional forms of these unknowns. Thereby, the present invention enables a seller or buyer conducting an auction for selling or procuring an item(s), to make decisions regarding the appropriate auction procedure to conduct that accurately reflects the bidders' attitude toward risk and the distribution of bidders' private information. Thus, the present invention allows for a more accurate formulation of decision problems faced by bidders and auction houses and, therefore, provides a more reliable identification of optimal decisions.

The preferred embodiment of the present invention, a method and apparatus for determining private information and risk attitudes, is thus described. While the present invention has been described in particular embodiments, it should be appreciated that the present invention should not be construed as limited by such embodiments, but rather construed according to the below claims.

What is claimed is:

1. A method for determining private information and risk attitudes comprising:
    accessing, from computer system memory, auction data from previously conducted auctions, wherein the auction data comprises bids submitted in utility-dependent auctions and bids submitted in utility-independent auctions, wherein the utility-dependent auctions comprise auctions in which bidding behavior depends on risk attitudes and the utility-independent auctions comprise auctions in which bidding behavior does not depend on risk attitudes;
    determining private information using the bids submitted in the utility-independent auctions;
    determining risk attitudes using the private information and the bids submitted in the utility-dependent auctions: and
    generating a report comprising information associated with at least one of the private information and the risk attitudes.

2. The method of claim 1, wherein determining private information further comprises using statistical density estimation techniques to nonparametrically estimate a joint distribution of private information.

3. The method of claim 1, wherein determining risk attitudes further comprises using quantile matching to nonparametrically estimate the risk attitudes.

4. The method of claim 1, wherein the utility-independent auctions and the utility-dependent auctions further comprise auctions for items having a common attribute.

5. A computer system comprising:
    storage that contains auction data from previously conducted auctions, wherein the auction data comprises bids submitted in utility-independent auctions and bids submitted in utility-independent auctions, wherein the utility-dependent auctions comprise auctions in which bidding behavior depends on risk attitudes and the utility-independent auctions comprise auctions in which bidding behavior does not depend on risk attitudes; and
    a processor that can access the storage, wherein the processor determines private information using the bids submitted in utility-independent auctions, and determines risk attitudes using the private information and the bids submitted in utility-dependent auctions:
    wherein the processor generates a report comprising information associated with at least one of the private information and the risk attitudes.

6. The computer system of claim 5, wherein the processor determines the private information using statistical density estimation techniques to nonparametrically estimate a joint distribution of the private information.

7. The computer system of claim 5, wherein the processor determines risk attitudes using quantile matching to nonparametrically estimate the risk attitudes.

8. The computer system of claim 5, wherein the utility-independent auctions and the utility-dependent auctions further comprise auctions for items having a common attribute.

9. A storage medium storing instructions that, when executed by a processor, cause the processor to:
    retrieve auction data from previously conducted auctions, wherein the auction data comprises bids submitted in utility-dependent auctions and bids submitted in utility-independent auctions;
    estimate private information using the bids submitted in the utility-independent auctions;
    estimate risk attitudes based on the private information and the bids submitted in the utility-dependent auctions, wherein the utility-independent auctions comprise auctions in which bidding behavior depends on risk attitudes, the utility-independent auctions comprise auctions in which bidding behavior does not depend on risk attitudes; and
    generate a report comprising information associated with at least one of the private information and the risk attitudes.

10. The storage medium of claim 9, wherein the instructions further cause the processor to apply statistical density estimation techniques to nonparametrically estimate the joint distribution of the private information.

11. The storage medium of claim 9, wherein the instructions further cause the processor to apply quantile matching to nonparametrically estimate the risk attitudes.

12. The storage medium of claim 9, wherein the utility-independent auctions and the utility-dependent auctions further comprise auctions for items having a common attribute.

13. An auction design system, comprising:
    a storage device containing an historical auction database comprising utility-dependent auction data for a plurality of utility-dependent auctions and utility-independent auction data for a plurality of utility-independent auctions, wherein the plurality of utility-dependent auctions comprises auctions in which bidding behavior depends on risk attitudes of a first plurality of bidders and the plurality of utility-independent auctions comprises auctions in which bidding behavior does not depend on risk attitudes of a second plurality of bidders;
    means for determining market structure, wherein private information for the second plurality of bidders is determined using the utility-independent auction data, and risk attitudes for the first plurality of bidders is determined using the private information and the utility-independent auction data: and
    means for generating a report comprising information associated with at least some of the private information and the risk attitudes.

14. The auction design system of claim 13, wherein the means for determining market structure uses statistical density estimation techniques to nonparametrically estimate the joint distribution of the private information, and uses the joint distribution to nonparametrically estimate the risk attitudes.

15. The auction design system of claim 13, further comprising:
    means for predicting bidding behavior for an auction decision candidate using the private information and the risk attitudes.

16. The auction design system of claim 15, wherein the storage device contains a bidding model database comprising auction bidding models; and
    the means for predicting the bidding behavior further receives an auction decision candidate and constraints, selects a bidding model from the bidding model database using the auction decision candidate and constraints, and applies the private information and the risk attitudes to the bidding model to predict the bidding behavior.

17. The auction design system of claim 16, further comprising:
    means for generating an evaluation of the auction decision candidate using the predicted bidding behavior, the private information, and the risk attitudes.

18. A method for analyzing auction data comprising:
    determining private information for a first plurality of bidders using utility-independent auction data stored in a computer system, the utility-independent auction data comprising auction data from a plurality of auctions in which bidding behavior does not depend on risk attitudes of the first plurality of bidders;
    determining risk attitudes for a second plurality of bidders using the private information and utility-dependent auction data stored in the computer system, the utility-dependent auction data comprising auction data from a plurality of auctions in which bidding behavior depends on the risk attitudes of the second plurality of bidders: and
    generating a report comprising information associated with at least one of the private information and the risk attitudes.

19. The method of claim 18, wherein
    determining private information further comprises nonparametrically estimating the joint distribution of the private information; and
    determining risk attitudes further comprises nonparametrically estimating the risk attitudes using the joint distribution.

20. The method of claim 18, wherein the plurality of auctions in which bidding behavior depends on the risk attitudes and the plurality of auctions in which bidding behavior does not depend on the risk attitudes further comprise auctions for items having a common attribute.

21. A method for analyzing auction data comprising:
    accessing utility-independent auction data and utility-dependent auction data from an auction database, wherein the utility-independent auction data comprises data from auctions in which bidding behavior does not depend on risk attitudes and the utility-dependent auction data comprises data from auctions in which bidding behavior depends on risk attitudes;
    determining a joint distribution function that represents private information of a first plurality of bidders using the utility-independent auction data;
    determining a utility of wealth function of a second plurality of bidders using the joint distribution function and the utility-dependent auction data: and
    generating a report comprising information associated with at least one of the joint distribution function and the utility of wealth function.

22. The method of claim 21, wherein the auctions in which bidding behavior depends on risk attitudes and the auctions in which bidding behavior does not depend on risk attitudes further comprise auctions of a same type of item.

23. The method of claim 21, wherein determining a joint distribution function further comprises using statistical density estimation techniques to nonparametrically estimate the joint distribution of the private information.

24. The method of claim 1, wherein accessing, from computer system memory, auction data further comprises accumulating the auction data into sets as a function of auction category, a first auction category being utility-dependent and a second auction category being utility-independent.

25. The computer system of claim 5, wherein the processor is further configured to accumulate the auction data into sets as a function of auction category, a first auction category being utility-independent and a second auction category being utility-independent.

26. The storage medium of claim 9, wherein the instructions further cause the processor to accumulate the auction data into sets as a function of auction category, a first auction category being utility-independent and a second auction category being utility-independent.

* * * * *

UNITED STATES PATENT AND TRADEMARK OFFICE
CERTIFICATE OF CORRECTION

| | |
|---|---|
| PATENT NO. | : 7,249,088 B2 |
| APPLICATION NO. | : 09/904311 |
| DATED | : July 24, 2007 |
| INVENTOR(S) | : Kemal Guler et al. |

It is certified that error appears in the above-identified patent and that said Letters Patent is hereby corrected as shown below:

In column 7, line 45, delete "mode" and insert -- model --, therefor.

In column 9, line 47, delete "utility-independent" and insert -- utility-dependent --, therefor.

In column 9, line 48, delete "additionally" and insert -- additional --, therefor.

In column 9, line 51, after "first" insert -- price --.

In column 11, line 30-31, in Claim 1, after "auctions" delete ":" and insert -- ; --, therefor.

In column 11, line 49, in Claim 5, delete "utility-independent" and insert -- utility-dependent --, therefor.

In column 11, line 60, in Claim 5, after "auctions" delete ":" and insert -- ; --, therefor.

In column 12, line 20, in Claim 9, delete "utility-independent" and insert -- utility-dependent --, therefor.

In column 12, line 58, in Claim 13, delete "independent" and insert -- dependent --, therefor.

In column 12, line 58, in Claim 13, after "data" delete ":" and insert -- ; --, therefor.

In column 13, line 34, in Claim 18, after "bidders" delete ":" and insert -- ; --, therefor.

In column 14, line 17, in Claim 21, after "data" delete ":" and insert -- ; --, therefor.

In column 14, line 38, in Claim 25, delete "utility-independent" and insert -- utility-dependent --, therefor.

UNITED STATES PATENT AND TRADEMARK OFFICE
CERTIFICATE OF CORRECTION

PATENT NO. : 7,249,088 B2
APPLICATION NO. : 09/904311
DATED : July 24, 2007
INVENTOR(S) : Kemal Guler et al.

It is certified that error appears in the above-identified patent and that said Letters Patent is hereby corrected as shown below:

In column 14, line 43, in Claim 26, delete "utility-independent" and insert
-- utility-dependent --, therefor.

Signed and Sealed this

Fifteenth Day of July, 2008

JON W. DUDAS
*Director of the United States Patent and Trademark Office*